United States Patent [19]

Bauhof

[11] Patent Number: 5,011,219

[45] Date of Patent: Apr. 30, 1991

[54] SLIDING RAISABLE ROOF OF FLAT CONSTRUCTION FOR MOTOR VEHICLES

[75] Inventor: Karl Bauhof, Weinsberg, Fed. Rep. of Germany

[73] Assignee: Karosseriewerke Weinsberg GmbH, Weinsberg, Fed. Rep. of Germany

[21] Appl. No.: 534,312

[22] Filed: Jun. 5, 1990

Related U.S. Application Data

[63] Continuation-in-part of Ser. No. 274,202, Nov. 21, 1988, abandoned.

[30] Foreign Application Priority Data

Nov. 21, 1987 [DE] Fed. Rep. of Germany ... 8715439[U]

[51] Int. Cl.$^5$ .............................. B60J 7/05; B60J 7/053
[52] U.S. Cl. ...................................... 296/221; 296/222
[58] Field of Search ............... 296/221, 222, 223, 216

[56] References Cited

U.S. PATENT DOCUMENTS 4,475,767 10/1984 Grimm et al. ................... 296/221
4,611,849 9/1986 Trenkler ........................ 296/121 X

FOREIGN PATENT DOCUMENTS 1289439 2/1969 Fed. Rep. of Germany .
3524840 1/1987 Fed. Rep. of Germany .
56747 10/1952 France ........................ 296/222

Primary Examiner—Andres Kashinkow
Assistant Examiner—Brian J. Johnson
Attorney, Agent, or Firm—Toren, McGeady & Associates

[57] ABSTRACT

A raisable sliding roof for motor vehicles, including a slidable rigid cover having front and rear ends, and which slides into a position in which a roof opening is covered, the cover being displaceable into an opening position in which is released from the opening, and raisable into a ventilation position, sliding shoes arranged to support the cover front end, additional sliding shoes and supporting arms arranged to support the cover rear end, a casing having two halves connected to articulate about an axis transverse to a cover sliding direction, the casing halves each having outer ends which are articulated at the vehicle roof by elastic joints, at least one lifting and lowering device supported at the vehicle roof for adjusting the casing halves from a substantially horizontal normal position into a downwardly bent position, guide rails arranged in the casing to receive the sliding and additional sliding shoes, blocks of springy elastic material and compression springs arranged to support at least one of the casing halves at a horizontal extension region of a roof reinforcement partially surrounding the roof opening, a strip-shaped beam arranged horizontally on a front wall of the one casing half so that the beam and the casing half rest against the elastic blocks, a screw bolt passing through each block so that the block abuts the bolt head, and a nut and one of the compression springs being arranged on each of the bolts at an end opposite the head to support the bolt, the nut end spring being on an upper side of the roof reinforcement.

4 Claims, 2 Drawing Sheets

SLIDING RAISABLE ROOF OF FLAT CONSTRUCTION FOR MOTOR VEHICLES

This is a continuation-in-part application of Ser. No. 07/274,202, filed Nov. 21, 1988, and now abandoned.

DESCRIPTION

The innovation is directed to a raisable-sliding roof of flat construction for motor vehicles whose rigid cover, which closes a roof opening in its closing position, is optionally displaceable into an opening position which releases the roof opening or merely raisable in an opened up ventilation position, and in which the cover is supported in the front by means of sliding shoes and, at the rear end, by means of additional sliding shoes and supporting arms and guide rails, which receive the latter, in a casing consisting of two halves which are connected with one another so as to be articulated around an axis directed transversely relative to the sliding direction of the cover, wherein the casing halves are articulated at the outer end in each instance at the vehicle roof and are adjustable from a substantially horizontal normal position at least into a downwardly bent position by means of at least one lifting and lowering device which is supported at the vehicle roof.

A raisable-sliding roof of flat construction of this constructional type for motor vehicles is known from the U.S. Pat. No. 4,741,572, the disclosure of which is incorporated herein by reference to describe the above-mentioned features, as well as various other features known in the art. In U.S. Pat. No. 4,741,572, it is provided that the guide rails supporting the cover are received, at least at their front end, in a plastics part which is oriented transversely relative to the sliding direction of the cover and overlaps the width of the roof cut-out portion, the plastics part, in turn, being supported so as to be articulated in a swiveling manner, particularly by means of swivel bearing pins and bearing block, at least at a front transverse web which is rigidly fastened at the front crossbar of the roof reinforcement. Such a swivelable suspension of the guide rails at the front crossbar of the roof reinforcement requires a series of individual parts or individual formations, respectively, which increases the required production cost for the raisable-sliding roof of flat construction and naturally also increases the required assembly cost at the same time. Moreover, this known articulation is not suitable for the articulation of the halves of a casing receiving the guide rails. Naturally, the same is also true with respect to the rear end articulation of the guide rails and the rear end articulation of the second casing half, respectively.

Therefore, the object of the innovation is to improve a raisable-sliding roof of flat construction of the constructional type named in the beginning for motor vehicles with respect to the articulation of the casing halves at the vehicle roof in such a way that the production and assembly of the articulation is simplified on the one hand and, on the other hand, adjusting possibilities are maintained at least to a certain extent and the assembly of additional mounted elements is benefited.

Based on a raisable-sliding roof of flat construction of the constructional type named in the beginning, this object is met, according to the innovation, in that at least one of the two casing halves is hinged at the vehicle roof so as to be articulated, particularly at a roof reinforcement which at least partially encloses the roof opening, by means of springing elastic means such as blocks of elastic material or pressure springs. For the articulation of the two casing halves at the vehicle roof and at a roof reinforcement which at least partially encloses the roof opening, respectively, only relatively small permissible swiveling angles are required which are absorbed, according to the innovation, substantially by means of elastic deformation of the springing elastic means used in the articulation. Accordingly, it is possible that the articulation of the casings can be used in conventional types of fasteners and can accordingly be produced and assembled without additional expenditure.

In a first preferred embodiment form, a strip-shaped carrier, which faces outward, is connected at the front wall at least of one of the casing halves, which front wall is located on the outside with respect to the roof opening, and the casing half is supported in an articulated manner at the vehicle roof and at the roof reinforcement, respectively, by means of this carrier accompanied by support against blocks of elastically deformable material, wherein the strip-shaped carrier is advantageously formed by means of a outwardly directed bent portion of the upper edge area of the front front-wall of the casing half and wherein the blocks of elastic material are fastened at the vehicle roof and at the roof reinforcement, respectively, by means of screw bolts.

To the extent that an individual carrier is connected at the front front-wall of the casing half, it can be constructed so as to be sufficiently stiff in order to ensure a uniform distribution of the bearing forces during a swiveling of the casing halves, so that the arrangement of only some blocks of elastic material is sufficient for supporting the casing halves at the vehicle roof and at the roof reinforcement, respectively, so as to swivel in an articulated manner.

However, if the strip-shaped carrier is formed by means of an outwardly directed bent portion of the upper edge area of the front front-wall of the casing half, it is recommended that a continuous strip-shaped block of springing elastic material be substituted for the individual blocks of elastic material.

It is provided, according to the innovation, by the construction of the blocks of elastic material as individual blocks or as a continuous block that the block or blocks of elastic material comprise a longitudinal recess, which is penetrated by a screw bolt which is fastenable at the roof reinforcement by means of a nut, in such a way that they are supported against the head of the screw bolt penetrating them and accordingly the casing half is in turn supported in an elastic manner against the roof reinforcement and the vehicle roof, respectively, by means of its strip-shaped carrier, which is supported on the blocks o block. Through-openings in the strip-shaped carrier and the bent edge portion of the front front-wall of the casing half, respectively, are assigned to the screw bolts supporting the blocks of elastic material, which throughopenings have a plan form diverging from the circular shape in such a way that a certain swiveling freedom is ensured relative to the axis of the screw bolts.

Naturally, other springs formed as pressure springs, particularly helical springs or the like, can also be provided in the same manner as the aforementioned blocks of elastic material.

According to another embodiment form of the innovation, it can be provided in addition that the screw bolts are supported by means of a nut at the roof reinforcement with the intermediary of a pressure spring, wherein the pressure spring is advisably constructed as a U-shaped leaf spring. Regardless of its respective individual construction, the articulation of the casing half at the vehicle roof and at the roof reinforcement, respectively, according to the innovation, makes it possible that the casing half is hinged at a substantially horizontal extension area of the roof reinforcement, and a supporting bracket for supporting the cover drive, particularly a gear unit and a threaded cable guide, engages with an edge flange between the horizontal extension area of the roof reinforcement and the bent edge portion of the front front-wall of the casing half in such a way that it is connected, together with the suspension of the casing half, at the roof reinforcement and its assembly accordingly requires no additional expenditure.

The innovation is explained in more detail in the following with the aid of the embodiment example shown in the drawing.

Figure 1:
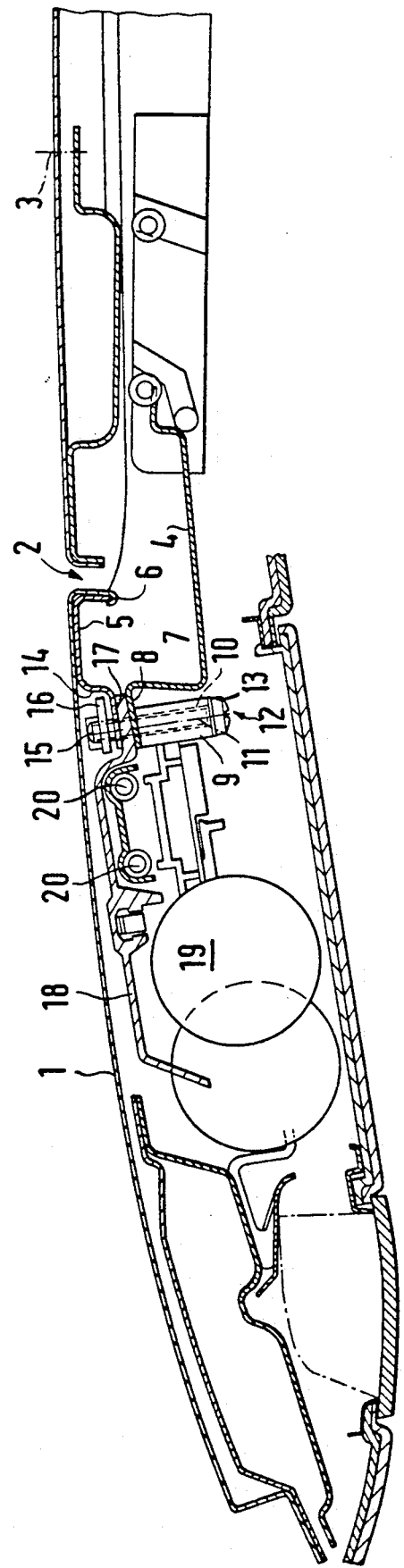
FIG. 1 shows a section through a suspension, according to the innovation, for the front half of a multiple-part casing for a raisable-sliding roof of flat construction.
Figure 2:
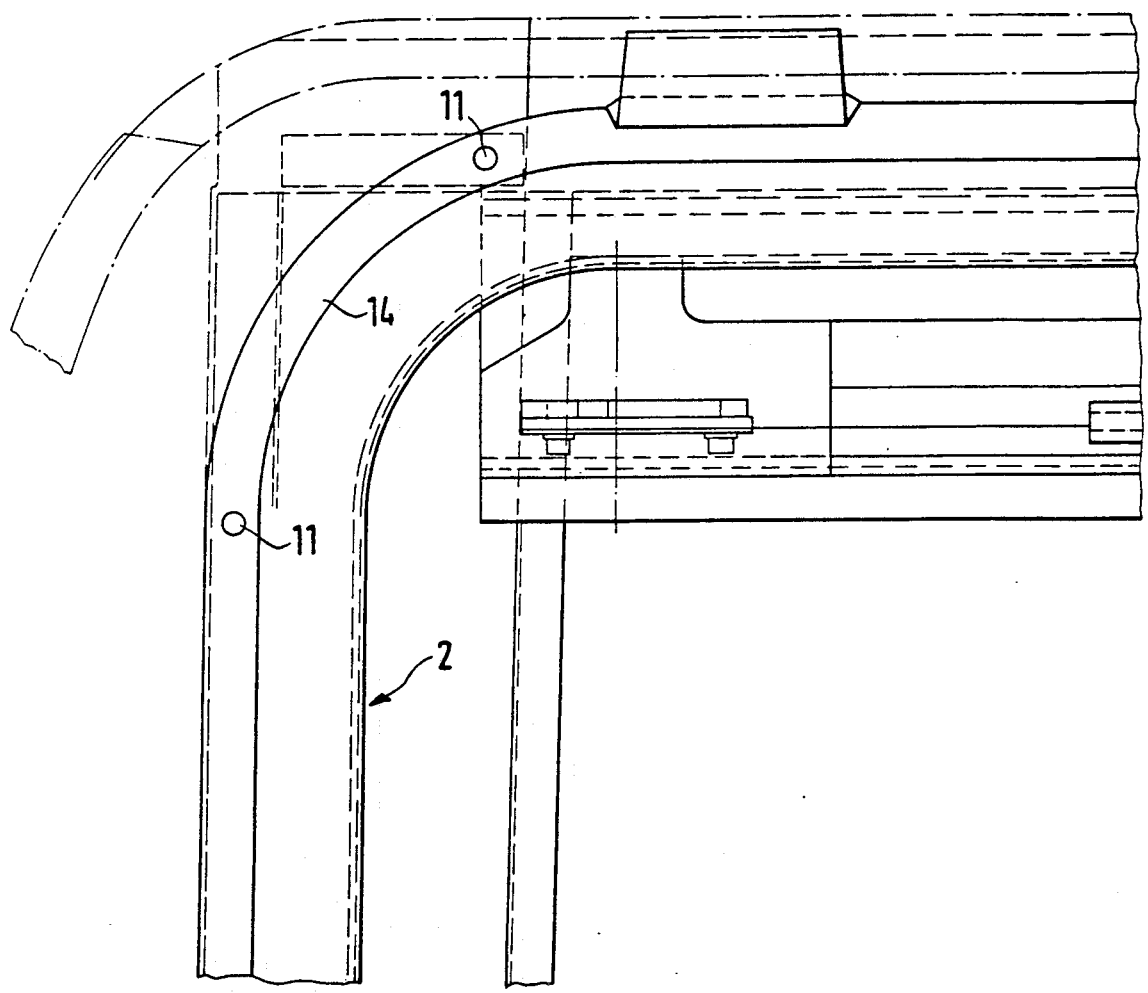
FIG. 2 shows a sectional top view of the articulation of the front casing according to FIG. 1.

A roof opening 2, which is closable by means of a cover 3, grasped underneath by a casing 4 which is divided into two halves, and enclosed by an at least partially circumferentially extending roof reinforcement 5, is arranged in the roof 1 of a motor vehicle. In the shown embodiment example, the roof reinforcement 5 is fastened at the roof membrane of the vehicle roof 1 by means of a flange 6. At its front front-wall 7, which is directed transversely relative to the sliding direction of the cover 3, the casing 4 comprises a strip-shaped beam 8 which is turned outward at the front and is supported in the shown embodiment example on a quantity of blocks 9 consisting of springing elastic material, particularly a plastics material. The blocks 9 of springing elastic material are provided with an axial bore hole 10 which is penetrated by the shaft 11 of a screw bolt 12. The blocks 9 of springing elastic material are supported at the head 13 of the screw bolt 12. At the other end, the shaft 11 of the screw bolt 12 penetrates a tailored portion or extension area 14 of the roof reinforcement 5 which is substantially parallel to the plane of the vehicle roof 1 and against which it is clamped by means of a nut 15. As indicated in the embodiment example, a pressure spring 16 can be provided in addition to the nut 15, which pressure spring 16 is constructed substantially as a U-shaped leaf spring and rests against the extension area 14 of the roof reinforcement 5 on one side and against the underside of the screw nut 15 on the other side. It can also be seen from FIG. 1 in particular that a flange 17 of a supporting bracket 18 for the drive mechanism of the cover, particularly a motor 19 and a gear unit connected downstream, as well as guides for the threaded cable 20, which is rigid against pressure, engages between the extension area 14 of the roof reinforcement 15 and the strip-shaped beam 8 of the front transversely directed front wall 7 of the casing half 4.

I claim:

1. A raisable sliding roof for a motor vehicle roof with a cutout therein, comprising:
    a roof reinforcement disposed on the vehicle roof so as to peripherally surround the roof cutout;
    a slidable rigid cover having a front end and a rear end, and which is slidable into a closed position in which the roof cutout is covered, said cover being selectively displaceable into an opening position, in which said cover is released from the roof cutout, and a ventilation position in which the rear end of the cover is raised relative to the roof so as to allow ventilation;
    a casing having two halves hinged together so as to be articulated about an axis transverse to the sliding direction of said cover, the casing halves each having outer ends;
    elastic joints provided so as to connect the outer end of each of the casing halves to the vehicle roof so that the casing halves are each pivotable at their outer ends about an axis transverse to the cover sliding direction;
    lifting and lowering means supported at the vehicle roof for swiveling the casing halves so that the casing is shifted from a substantially horizontally normal position into a downwardly bent position relative to the vehicle roof;
    guide rails provided in said casing;
    sliding shoes provided in said guide rails and connected to said cover so as to support the front end of said cover;
    additional sliding shoes provided in said guide rails, and supporting arms having one end hinged to said additional sliding shoes and another end attached to said cover so as to support the rear end of said cover;
    blocks of resilient elastic material and pressure springs arranged so as to support at least one of the casing halves at a horizontal extension region of the roof reinforcement at least partially surrounding the roof opening;
    a strip-shaped angle beam which is outwardly directed relative to the roof cutout, and is connected horizontally to an upper edge area of a front wall of said at least one casing half so that said beam and said at least one casing half rest against said blocks of resilient elastic material;
    a plurality of screw bolts including one bolt passing through each block so that the block abuts a head of the screw bolt; and
    a nut and one of said pressure springs being arranged on each of said plurality of bolts at an end opposite said head so as to support said bolt, said nut and spring being on an upper side of the roof reinforcement relative to the vehicle roof.

2. A raisable-sliding roof according to claim 1, wherein the strip-shaped beam has through-openings assigned to the screw bolts, the through openings having a plan form which diverges from a circular shape.

3. A raisable-sliding roof according to claim 2, wherein the pressure springs are U-shaped leaf springs.

4. A raisable-sliding roof according to claim 1, wherein the at least one casing half 4 is hinged at a substantially horizontal extension area of the roof reinforcement 5, and further comprising cover drive means and a support bracket 18 arranged so as to support the cover drive means, the supporting bracket being engageable with an end flange between the horizontal extension region 14 of the roof reinforcement 5 and the angled portion of the front wall 7 of the casing half 4 so that it is connected, together with the suspension of the casing half 4, at the roof reinforcement 5.

* * * * *